United States Patent [19]

Herpel

[11] 4,290,639
[45] Sep. 22, 1981

[54] WIND DEFLECTOR

[76] Inventor: Donald R. Herpel, 29466 Candlewood, Southfield, Mich. 48076

[21] Appl. No.: 116,038

[22] Filed: Jan. 28, 1980

[51] Int. Cl.³ .............................................. B62D 35/00
[52] U.S. Cl. ..................................... 296/1 S; 296/91
[58] Field of Search .................................. 296/1 S, 91

[56] References Cited

U.S. PATENT DOCUMENTS

| D. 249,783 | 10/1978 | Herpel | D12/181 |
|---|---|---|---|
| 2,737,411 | 3/1956 | Potter | 296/1 |
| 3,514,023 | 5/1970 | Russell et al. | 224/42.1 |
| 3,596,974 | 8/1971 | Adams | 296/15 |
| 3,711,146 | 1/1973 | Madzzar | 296/15 |
| 3,834,752 | 9/1974 | Cook et al. | 296/15 |
| 3,945,677 | 3/1976 | Servais et al. | 296/15 |
| 3,951,445 | 4/1976 | Tatom | 296/15 |
| 4,006,931 | 2/1977 | Groves | 296/15 |
| 4,030,779 | 6/1977 | Johnson | 296/15 |
| 4,082,340 | 4/1978 | Taylor | 296/15 |
| 4,102,548 | 7/1978 | Kangas | 296/15 |
| 4,156,543 | 5/1979 | Taylor et al. | 296/15 |
| 4,160,494 | 7/1979 | McCambridge | 296/15 X |

Primary Examiner—Joseph F. Peters, Jr.
Assistant Examiner—Norman L. Stack, Jr.
Attorney, Agent, or Firm—Burton, Parker & Schramm

[57] ABSTRACT

A wind deflector having a movable fairing is mounted on the tractor cab of a tractor-trailer combination to allow for the reduction of wind resistance during movement of the vehicle. The deflector which may be mounted directly to the cab or a stationery wind deflector has a fairing which pivots between operative positions which direct the air to reduce wind resistance and the rest position where the fairing has no substantial effect on wind resistance. Alternative methods are provided to move the fairing from its rest position to its operative position, including use of an air bag inflated by wind generated during movement of the vehicle or an air cylinder. The deflector is designed to be deployed during movement of the vehicle and may include the ability to change its operative position during movement of the vehicle.

7 Claims, 13 Drawing Figures

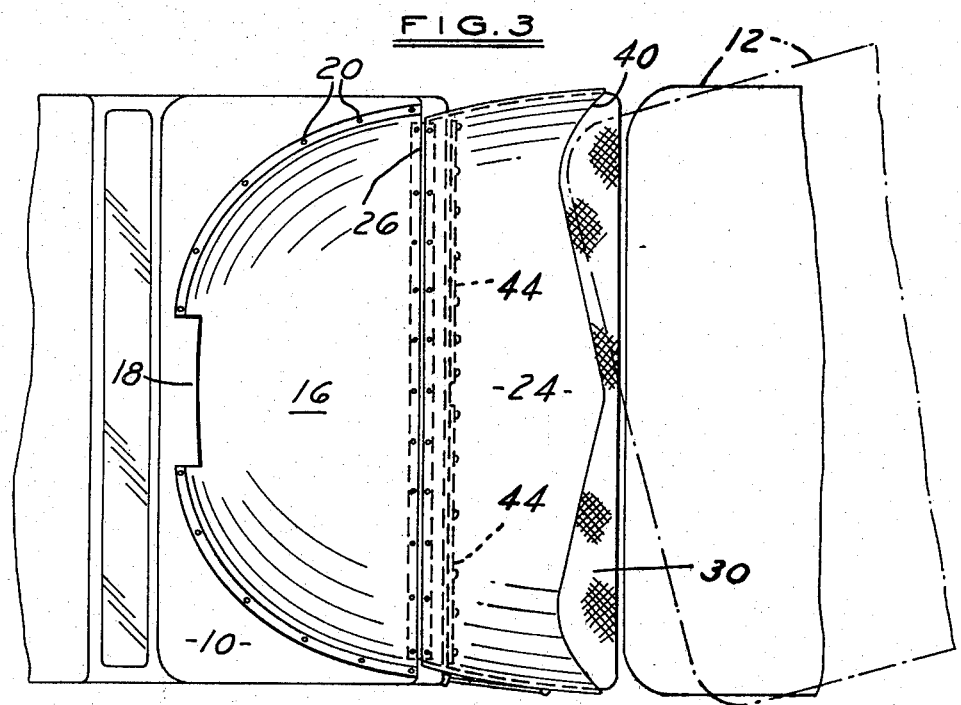
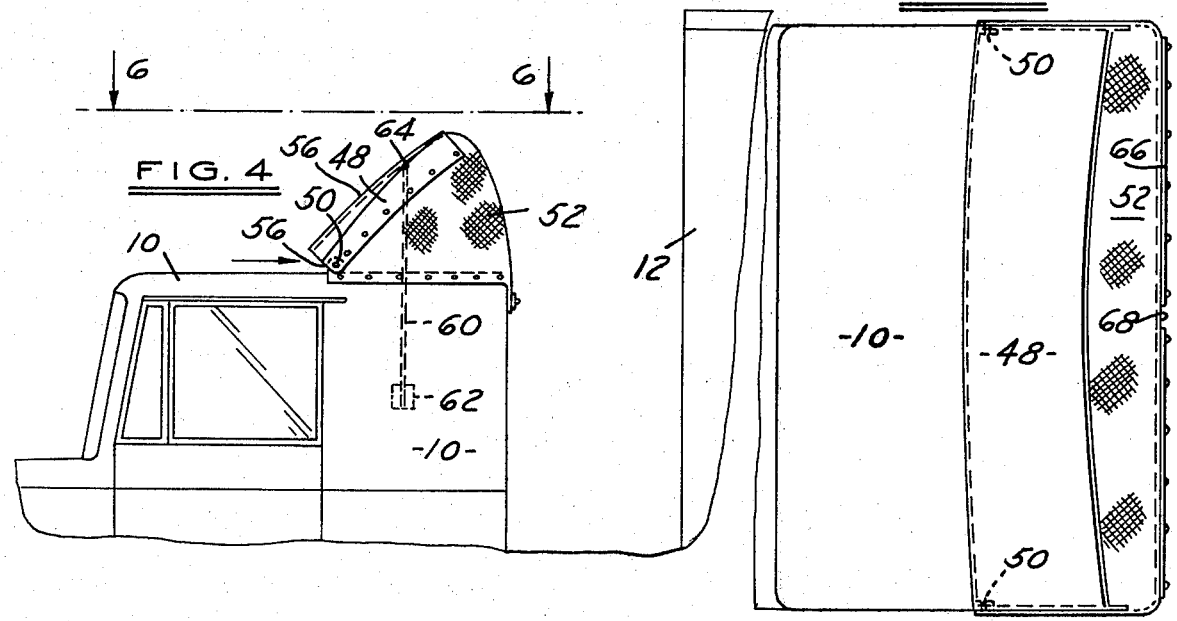
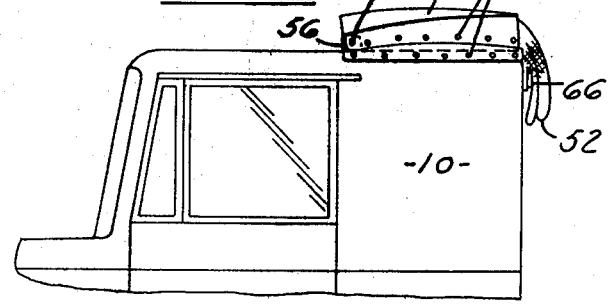

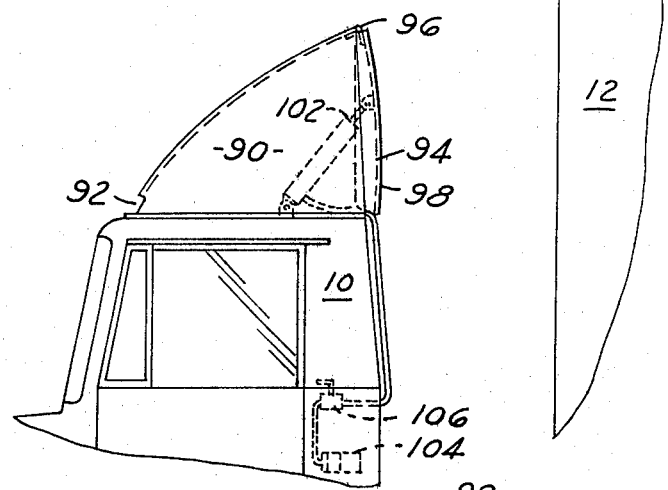
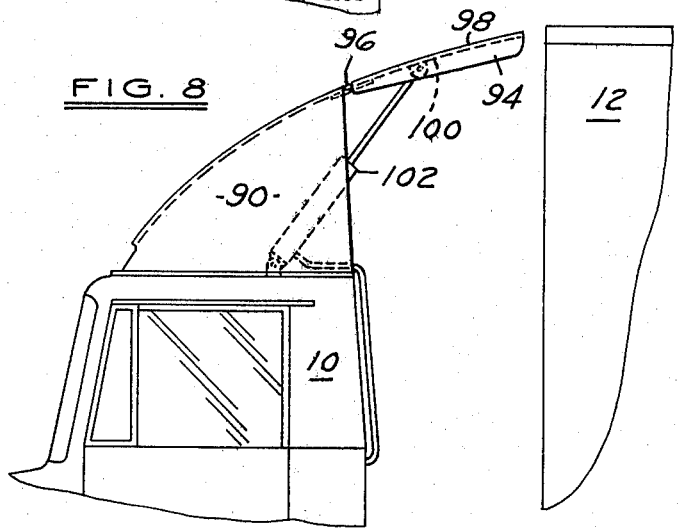
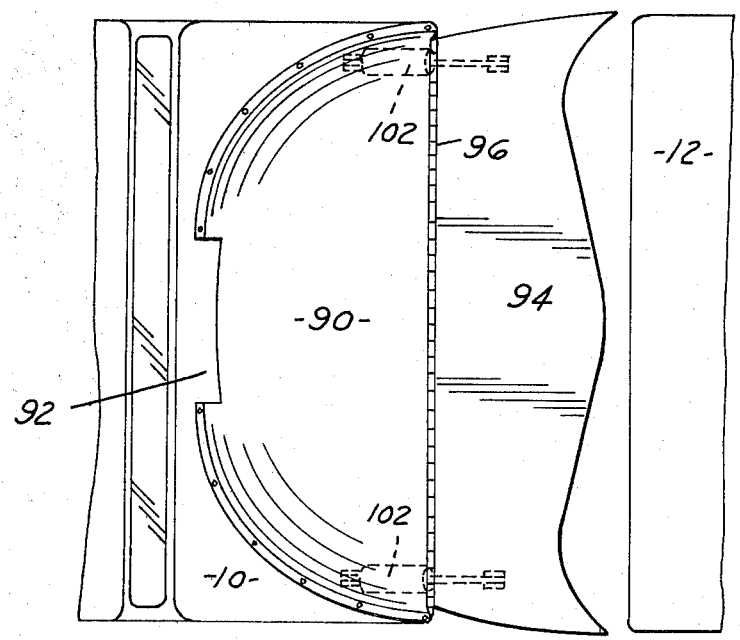

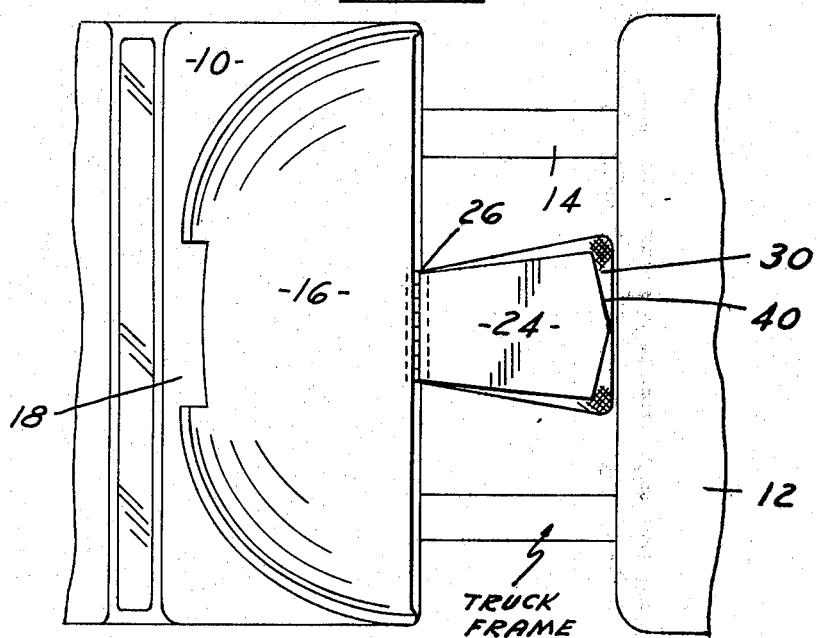
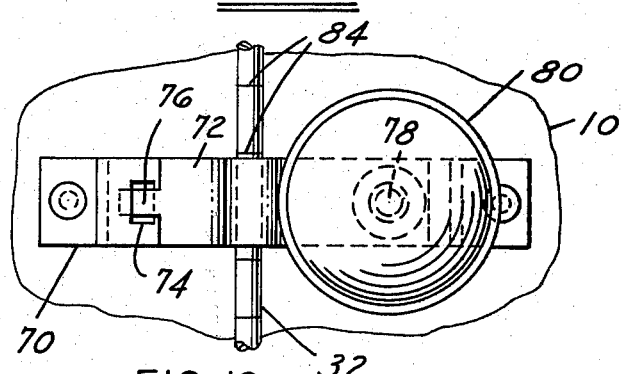
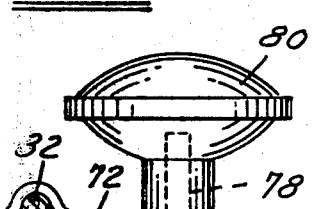
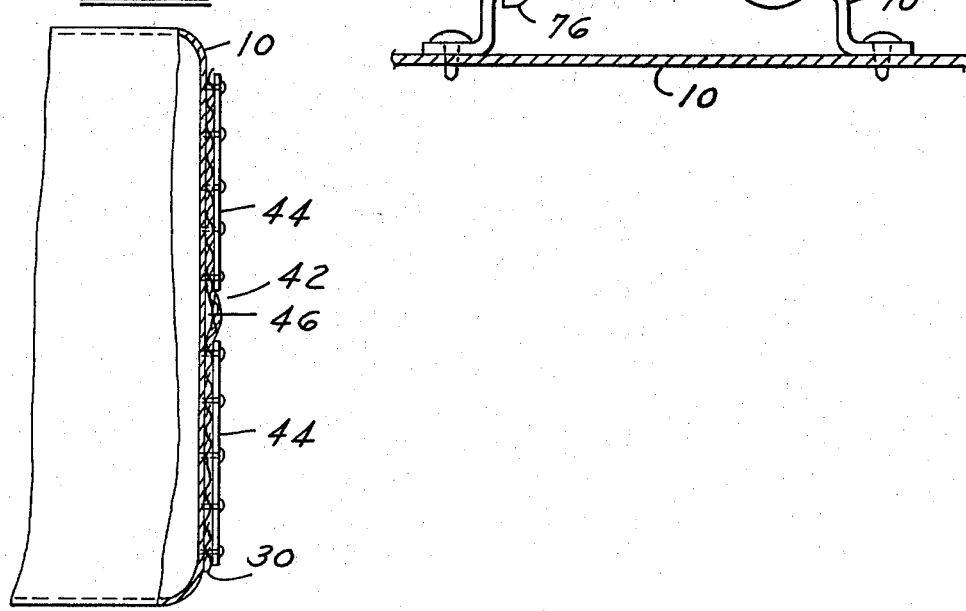

WIND DEFLECTOR

BACKGROUND OF THE INVENTION

Due to the increased emphasis on fuel conservation, numerous devices have been proposed for reducing aerodynamic drag on tractor and trailer vehicles so to provide greater fuel efficiency. Normally, these deflectors consist of a rigid device placed atop the tractor cab to streamline the vehicle design at normal highway speeds. These deflectors must be positioned prior to any movement of the vehicle and therefore yield disadvantageous aerodynamic profiles at speeds other than the normal cruising speeds for which they were designed.

Another type of wind deflector has been suggested in the past which is not rigid. These essentially are bag type devices which will deploy on movement of the vehicle. These, however, do not allow any detailed design of their surfaces to provide the best aerodynamic shape available, as may be done using rigid surfaces.

The prior art generally also suffers from the inability of any given design to be easily modified to take into account different heights of trailer units.

To improve upon the above-mentioned types of deflectors and to give other advantages which will become apparent from the following description, the invention was developed.

SUMMARY OF THE INVENTION

The present invention is directed to a device for reducing the wind resistance of a vehicle having two sections where the second section extends above and behind the first section. Normally, this vehicle would be what is termed a tractor-trailer combination. A fairing has a rest position where it has no substantial wind deflection characteristics and an operative position where it directs air flow between vehicle sections reducing wind resistance. There are actuating means for raising the fairing between these positions during movement of the vehicle. The actuating means may be in the form of an air bag or air cylinder. There are also provided means for changing the operative position. This allows for the device to be used when different trailers are attached to the tractor.

DESCRIPTION OF THE DRAWINGS

FIG. 3 is a top view of the embodiment with the fairing in its operative position.

FIG. 4 is a side elevation view of a second embodiment of the invention with the fairing in an operative position.

FIG. 5 is a side elevation view of the embodiment of FIG. 4 with the fairing in its rest position.

FIG. 6 is a top view of the embodiment of FIG. 4 with the fairing in an operative position.

FIG. 7 is a side elevation view of a third embodiment of the invention with the fairing in its rest position.

FIG. 8 is a side elevation view of the embodiment of FIG. 7 with the fairing in an operative position.

FIG. 9 is a top view of the embodiment of FIG. 7 with the fairing in an operative position.

FIG. 10 is a top view of a fourth embodiment of the invention with the fairing in an operative position.

FIG. 11 is a top view of a cable retainer.

FIG. 12 is a side view of the cable retainer.

FIG. 13 shows means for allowing drainage of the inflatable bag used in the embodiments of FIGS. 1 and 4.

DESCRIPTION OF PREFERRED EMBODIMENTS

Figure 1:
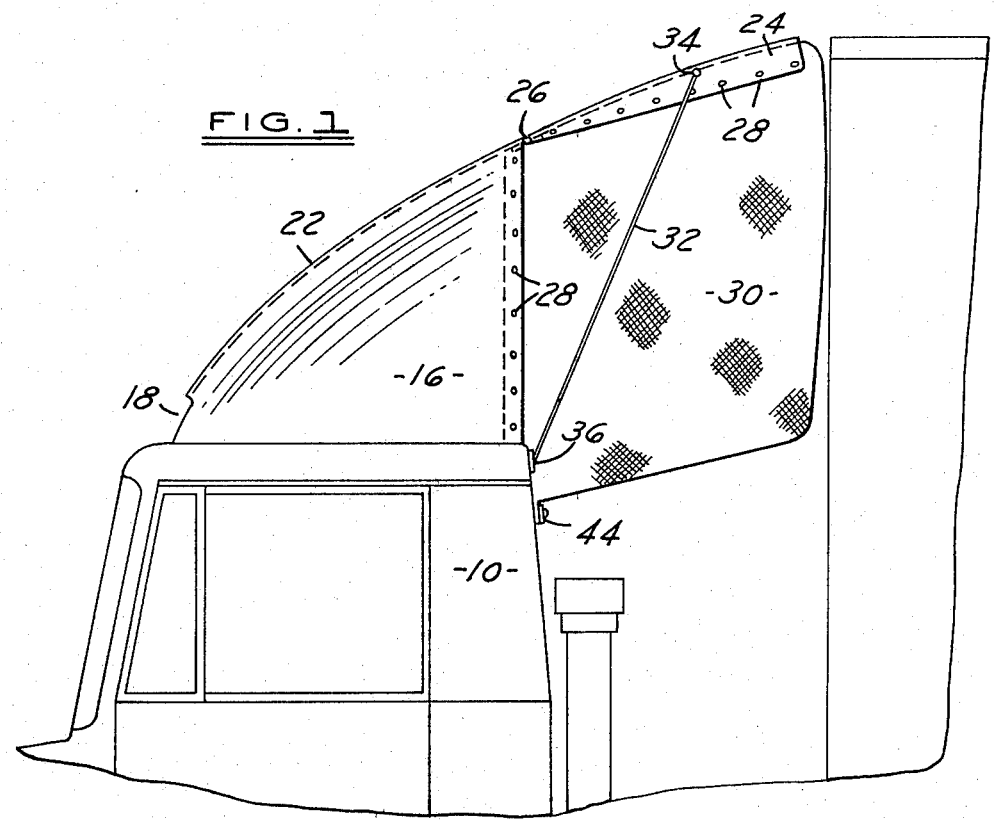
FIG. 1 is a side elevation view of a device embodying the invention, including a partial view of a tractor-trailer with the fairing in an operative position.

The invention is a device for reducing wind resistance on tractor-trailer combinations or similar vehicles where there is a height difference between the first section of the vehicle combination and the second section. The most common application will be for the case where there is a tractor cab 10 and a trailer 12. As shown in FIG. 10, the trailer rests on a frame portion 14 of the tractor so that the upper cab area of the tractor and the trailer are spaced apart. In the past most rigidly constructed wind deflectors are placed on the cab roof and do not extend into the area between the cab and the trailer. One type of previously used wind deflectors is shown in U.S. Pat. No. D-249783 dated Oct. 3, 1978 issued to the present invention. This deflector 16 may be used as part of the present invention as shown in the first embodiment of FIGS. 1, 2 and 3. The deflector features an opening 18 which allows the deflector to be placed over lights (not shown) and may be placed upon the cab roof while allowing the lights to remain in use. In addition, the opening allows air to flow into the interior of the deflector. The deflector is rigidly mounted on the cab roof by bolts 20 or other attachments means so that it is stationary. The surface 22 of the deflector is more clearly shown in the above-identified design patent which is incorporated herein by reference and directs air during movement of the vehicle around the protruding sections of the trailer to yield a more streamline vehicle. This saves on energy requirements of the vehicle.

Figure 2:
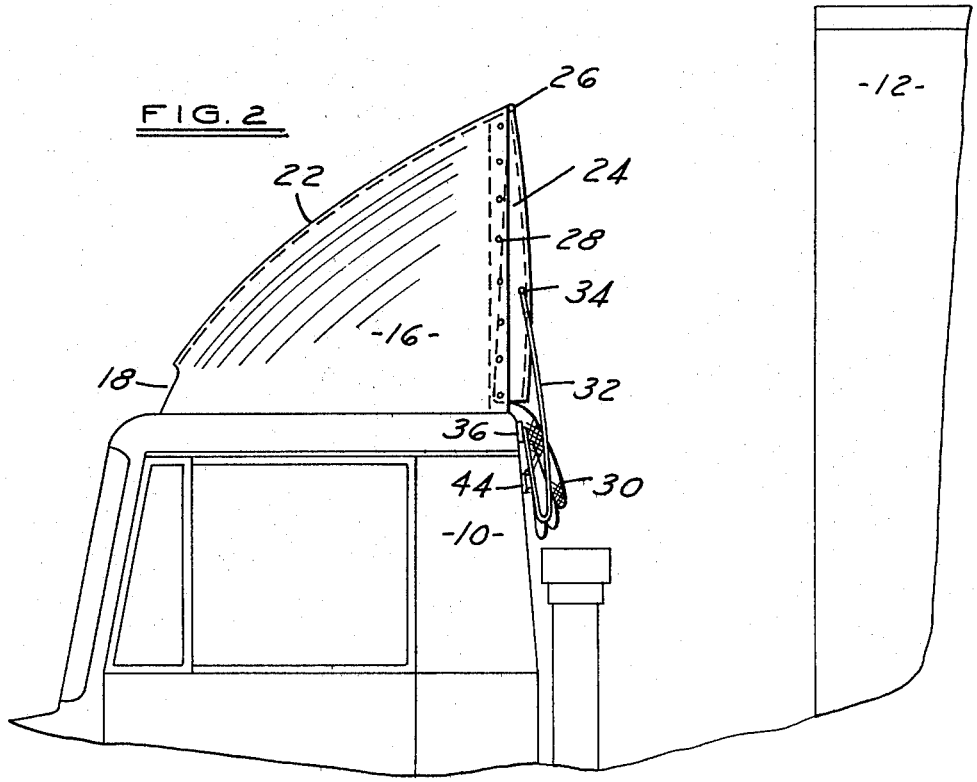
FIG. 2 is a side elevation view of the embodiment with the fairing in its rest position.

Use of a stationery deflector which does not span the space between the tractor and trailer will not yield optimum performances since there will be tendency of the air flow to close in behind the deflector and cab and yield some drag. This first embodiment of the invention fills the space between the cab and trailer by means of movable fairing 24 which is mounted along the rear edge of deflector 16. This mounting is by means of a pivot 26 so that normally the fairing will drop to a lower position as shown in FIG. 2. The fairing in this lower or rest position yields no substantial wind deflection characteristics since it is hidden behind the deflector 16. It has attached to it by rivets 28 an air bad 30. This air bag is also riveted to the deflector and the cab body to form an air enclosure having its major opening connected to the interior of the wind deflector. During movement of the vehicle, air will move through opening 18 into the interior of the wind deflector 16 and attempt to inflat the bag 30. As the speed of the vehicle increases, the air pressure within the bag will raise the fairing around pivot 26. To control the extent to which the fairing may pivot, there is a cable 32 joined to the fairing by a cable attachment 34 and the cable is fed through a cable retaining and adjustment means which may take the form of cable retainer 36. This provides fairing control means which limits the amount the fairing can pivot upward. The upward movement of the fairing may also be stopped when the bag is fully inflated. However, use of a cable or similar device allows for deploying the fairing in more than one position. When at its deployed or operative position, the fairing working with the wind deflector will yield a smooth wind profile along the vehicle to greatly reduce wind resistance. In addition to the deployed fairing reducing drag from the wind flow over the vehicle created by forward movement of the vehicle, the inflated air bag also reduces the cross wind flow of air within the gap between the cab and trailer body. The surface of the fairing is of rigid construction so that it may be designed to hold any desired features which may yield the best possible wind profile. Thus, in this embodiment the fairing is given a slight slope so that when in operative position the slope of the wind deflector is continued along the fairing to give a smooth surface along which the wind may be directed.

Since the fairing is used in its operative position during movement of the vehicle, attention must be paid to relative movement between the vehicle sections during turning. Thus, the fairing is sculptured 40 to allow for the trailer's position during turning as shown in phantom outline in FIG. 3. It should be noted that since the fairing will not deploy at very low speeds, the sculpturing need only take into account the angles of turns which may be encountered during highway driving.

Due to the opening in the wind deflector to allow air flow, there is a possibility that water may collect in the air bag. To drain this water, there is provided a gap 42 in the retainer strip 44 which holds the bag in place against the cab. As shown most clearly in FIG. 13, the bag at the gap is not tightly held against the cab body so to create a drainage hole 46.

A second embodiment of the invention is shown in FIGS. 4–6. This embodiment can be used as a replacement for the stationary wind deflectors now found on many tractor-trailer combinations. As with the first embodiment, there is a moveable fairing 48 which is mounted atop the tractor cab 10 by means of pivot 50. When the vehicle is not moving the fairing will move around the pivots to its rest position as shown in FIG. 5 where the fairing will have little affect on the wind flow due to its lying next to and along the roof of the cab. Positioned between the fairing and the cab is a bag 52 which is held by rivets 54 to the fairing and the cab and is substantially closed except for a forward facing opening 56 through which air may enter the bag. As with the first embodiment, during movement of the vehicle, air will flow into the bag pivoting the fairing into an operative position such as shown in FIGS. 4 and 6. At this position, the upper surface 58 of the fairing will substantially enter the flow of air around the vehicle and deflect is past the protruding sections of the trailer 12, thus streamlining the vehicle. As with the previous embodiment, means are provided to control the operative position of the fairing when fully deployed including cable 60 and cable retainer 62. Unlike the first embodiment, however, the cable is attached so to pass through the interior of the bag and into the cab body itself. Although this requires a hole in the roof of the cab, the hole is so small relative the opening that it has no real affect on deployment of the bag during movement of the vehicle. Placement of the cable retainer within the cab allows adjustment during movement of the vehicle if that is deemed necessary by the driver. As with the first embodiment, the cable may be attached to the fairing by means of a bolt 64.

Again, to allow drainage of any water which may collect, a split retaining strip 66 is used along the rear of the cab as with the first embodiment to create a drainage hole 68.

A specific type of cable retainer which may be used is shown in FIGS. 11 and 12. This particular cable retainer has two major portions, a bracket 70 which serves as the base of the retainer and a clasp 72. The clasp is held within the base loosely at an opening 74 through which a tab 76 on the clasp is placed. The other end of the clasp is joined to the base by a screw 78 upon which a knob 80 is placed. The clasp features a retaining portion 82 which is bent away from the base and through which the cable 32 is placed. At times at which the cable is at its desired position, knob 80 is turned tightening screw 78 and thus rigidly holding the base and clasp together. This causes the cable to be rigidly held between the base and the clasp at the retaining portion. However, if it is desired to change where the cable is held, and thus change the operative position of the fairing, this may be done by loosening the knob which in turn loosens the area where the cable is held. The cable may then be moved through the retaining portion until the desired place on the cable is reached, at which place it may be held again by tightening the knob. To aid in selecting the desired operative positions of the fairing, the cable may have markings 84 corresponding to predetermined operative positions of the fairing. Of course, this retaining means is only one of many which may be used and in instances where adjustment during movement is common, a cable retainer such as a winch with ratchet and pawl means may be more desirable.

In FIG. 10 a modified version of the first embodiment is shown where the fairing only extends partially across the width of the vehicle. Although wind profile in this instance is not as good as with a full fairing, the bag and fairing do give the vehicle better fuel efficiency especially with the bag decreasing the affects of cross winds through the opening between the vehicles.

A final embodiment is shown in FIGS. 7–9. This has many of the same features as that shown in the first embodiment. However, the actuating means are quite different. As with the first embodiment, a stationary wind deflector 90 is placed on the cab 10 of a tractor-trailer combination. Although the deflector has an opening 92, this opening is not part of the actuating means as with the first embodiment but merely to give visability to the lights of the vehicle found on the roof of the cab. A rigid fairing 94 is attached along the rear edge of the deflector by pivots 96 yielding an inoperative position as shown in FIG. 7 similar to that of the first embodiment where the upper surface 98 of the fairing has no substantial wind deflection characteristics. Attached to a lower surface 100 are a pair of pnuematic cylinders 102 which are also attached to the roof of the cab. The pneumatic cylinders may be controlled so to raise the fairing from its inoperative position to its operative position such as shown in FIGS. 8 and 9. As shown in FIG. 7, the pnuematic cylinders take advantage of the preexisting air supply 104 of the cab. A control valve 106 is provided inside the cab so to allow the driver to position the fairing during movement to the operative position he desires.

I claim:

1. A device for reducing wind resistance of a road vehicle having a forward roof section and a second section having a portion positioned rearwardly and above said forward section comprising:

a pivotably mounted rigid fairing joined to the forward section with an outer surface for wind deflection and an interior portion;

said fairing pivotable between a rest position where the outer surface has no substantial wind deflection characteristics and a raised operative position where the outer portion directs air flow between the vehicle sections;

air actuating means for raising said fairing from rest to operative position during movement of the vehicle; and said air actuating means comprising a member inflatable by a portion of the air flow passing over the forward section generated during forward movement of said vehicle where inflation of the member pivots the fairing to the operative position.

2. The device of claim 1 wherein the inflatible member is a bag with a forward facing opening with a lower portion attached to stationary portions of the forward section and an upper portion of the bag joined to the rear interior portion of the fairing.

3. The device of claim 1 wherein the fairing is joined to the forward section by means of a non-movable air deflector with the fairing mounted along the rear upper edge of the wind deflector so when the fairing is in the operative position it spans the distance between the non-movable deflector and the second section.

4. A device for reducing wind resistance of a road vehicle having a forward roof section and a second section having a portion positioned rearwardly and above said forward section comprising;

a pivotably mounted rigid fairing with an outer surface for wind deflection and an interior portion joined to the forward section;

said fairing pivotable between a rest position where the outer surface has no substantial wind deflection characteristics and a variable maximum operative position where the outer portion directs air flow between the vehicle sections;

actuating means for raising said fairing from rest to variable maximum operative position during movement of the vehicle;

adjusting means for changing the maximum operative position; and said actuating means comprising a member inflatable by a portion of the air flow passing over the forward section generated by forward movement of said vehicle where inflation of the member pivots the fairing to the operative position.

5. A device of claim 4 wherein the adjustment means allow for varying the maximum position of said fairing during movement of the vehicle.

6. The device of claim 4 or 5 wherein the adjustment means comprise a cable joined to the fairing and a cable retaining means joined to the forward section.

7. The device of claim 6 wherein the cable retaining means include a winch.

* * * * *